United States Patent
Greif (10) Patent No.: US 6,366,048 B2
(45) Date of Patent: Apr. 2, 2002

(54) METHOD AND ARRANGEMENT FOR REGULATING THE CURRENT IN A SWITCHED RELUCTANCE MACHINE

(75) Inventor: Andreas Greif, Munich (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/741,898

(22) Filed: Dec. 22, 2000

(30) Foreign Application Priority Data

Dec. 22, 1999 (DE) .......................... 199 61 798

(51) Int. Cl.$^7$ ................................. H02P 7/05
(52) U.S. Cl. .................. 318/701; 318/254; 318/432; 388/906
(58) Field of Search .................. 318/254, 430–433, 318/599, 600, 609, 610, 685, 700, 701; 388/906

(56) References Cited

U.S. PATENT DOCUMENTS

| | | | |
|---|---|---|---|
| 4,707,650 A | * 11/1987 | Bose | ........................... 318/685 |
| 4,961,038 A | * 10/1990 | MacMinn | .................... 318/696 |
| 5,754,024 A | 5/1998 | Sugiyama | ................... 318/701 |
| 5,789,893 A | * 8/1998 | Watkins | ....................... 318/701 |
| 5,852,355 A | * 12/1998 | Turner | ......................... 318/701 |

FOREIGN PATENT DOCUMENTS

| | | |
|---|---|---|
| DE | 43 10 772 | 10/1994 |
| EP | 0 684 693 | 11/1995 |

* cited by examiner

Primary Examiner—Bentsu Ro
(74) Attorney, Agent, or Firm—Crowell & Moring LLP (57) ABSTRACT

A method and an apparatus for regulating the phase current in the windings of a reluctance machine. Regulation is carried out using a digital regulator, which operates using a PI characteristic and presets pulse-width-modulated pulses for a DC chopper controller. Set values, which are a function of the phase voltage, are superimposed on the regulator manipulated variable by means of a pilot control.

10 Claims, 3 Drawing Sheets

METHOD AND ARRANGEMENT FOR REGULATING THE CURRENT IN A SWITCHED RELUCTANCE MACHINE

BACKGROUND AND SUMMARY OF THE INVENTION

This application claims the priority of German Application 19961798.8, filed Dec. 22, 1999, the disclosure of which is expressly incorporated by reference herein.

The invention relates to a method and an arrangement for regulating the phase current in a switched reluctance machine, whose stator windings in each phase are each connected to a DC chopper controller which is connected to a regulator which processes the control error between the required current value and the measured actual current value and applies pulse-width-modulated electrical pulses to the DC chopper controller.

An arrangement of the type described above is known (U.S. Pat. No. 5,754,024). The DC chopper controller in each phase of the known arrangement comprises a first series circuit of a switching transistor with a freewheeling diode, and a second series circuit of a freewheeling diode with a switching transistor. The switching transistor in the first series circuit is connected to the positive pole of a DC voltage source, and the switching transistor in the second series circuit is connected to the negative pole of the DC voltage source. The freewheeling diodes are reverse-biassed with respect to the polarity of the DC voltage source. The control electrodes of the switching transistors, which are IGBTs, are connected to a pulse-width modulator which has a first input connected to a clock generator, a second input connected to a comparator, and a third input to which an on/off signal is applied. The phase winding is arranged in series with a current sensor between the points where the switching transistors are connected to the freewheeling diodes. A first input of the comparator has a required current value applied to it, and a second input has the actual current value from the current sensor applied to it. The required current value and the on signal together with the off signal for the pulse-width modulator are determined as a function of the rotor position, measured by a sensor. The pulse-width modulator starts when it is intended to apply current to the respective winding, and stops when it is intended to stop current flowing in the winding once again.

German Patent DE 43 10 772 C2 discloses a method for regulating the phase current in a switched reluctance machine, whose stator windings in each phase are each connected to a DC chopper controller, which is connected to a regulator which processes the control error between the required current value and the measured actual current value and applies pulse-width-modulated electrical pulses to the DC chopper controller. In the case of the control circuit disclosed there, the control error between the required current value and the actual current value is supplied to a PI regulator.

European Patent EP 0 684 693 A2 discloses an arrangement for regulating the phase current of brushless DC machines and switched reluctance machines, in which the control error is determined from the required values and from actual current values obtained by sampling and equidistant intervals.

A three-point regulator with hysteresis is suitable for regulating the phase current in the reluctance machine. The output of the three-point regulator can assume three states, each of which can be associated with a switching state of a converter or DC chopper controller. The association with the "on, short-circuit" and "off" switching states of the current regulator allows the phase current to be regulated not only in motor operation but also in generator operation down to zero speed, without the three-point regulator needing to be switched. If the three-point regulator has identical switching thresholds when the reluctance machine is being operated as a motor and as a generator, this, in fact, results in a higher mean current value in generator operation than in motor operation. This effect can be minimized by hysteresis loops which are shifted one above the other. One advantage of a three-point regulator with hysteresis is its simple structure.

A disadvantage of the three-point regulator is that the converter switching frequency caused by the three-point regulator depends not only on the switching thresholds but also on the rate of current change in the machine winding, which in turn depends on the phase voltage, the winding resistance, the present current value, the phase inductance (which is dependent on the rotor position) and the rotation speed. Taking account of these influencing variables, the switching thresholds of the three-point regulator must be selected such that the maximum switching frequency of the power semiconductors in the converter is not exceeded. During operation of the reluctance machine, this results in switching frequencies which are well below the maximum switching frequency and are in the audible range. As a result the reluctance machine produces irritating noises.

The invention is based on the problem of specifying a method which can be matched flexibly to different situations that occur with reluctance machines, and an arrangement for regulating the current in phase windings of a switched reluctance machine, in which irritating noise from the reluctance machine, caused by the switching frequencies of the converter active devices is largely avoided and in which the phase currents can be set dynamically and quickly to the predetermined required values.

According to the invention, with regard to a method of the type described initially, the problem is solved by determining the control error from the required values and from actual current values obtained by sampling at equidistant intervals. Also a first manipulated variable is formed from the control error digitally using a proportional-integral characteristic, by linear superimposition of an integral element and a proportional element which is multiplied by the respective electrical angular position of the reluctance machine. Furthermore the first manipulated variable has a second manipulated variable superimposed on it linearly, which is formed as a pilot control value of a characteristic value by multiplication by the rotation speed, which characteristic value is read, as a function of the phase current and as a function of the electrical angular position of the rotor, from a characteristic map, which includes the derivative of the magnetic flux of the reluctance machine with regard to the electrical angular position, as a function of the electrical angular position of the rotor of the reluctance machine and as a function of the phase current. The method according to the invention allows the phase currents to be well regulated even at high rotation speeds and at high pulse-width-modulation frequencies, as well as allows for rapid changes in the induced phase voltage.

One preferred embodiment provides that characteristic values are stored in a table as a function of the electrical rotor angle positions. The characteristic values are determined from a data set with the magnetic flux values of the reluctance machine as a function of the electrical rotor angular position and of the phase currents by deriving the flux values with respect to the rotor angle, by division by a saturation current which is typical for the transition to the saturated magnetic state, and by forming the mean values of the respective rotor position. The pilot value is formed by multiplication of the characteristic value, which is read as a function of the measured electrical rotor angular position, by the rotation speed and the phase current. In this embodiment, relatively little memory capacity is required for storing the characteristic values. The approximate determination of the rotational voltage value for the pilot control is not a disadvantage, because the regulator can quickly compensate for a relatively small error between the required value and the actual value.

In one expedient embodiment, the control error at the time $t_K = k*T_A$ is calculated using the following equation $e(k) = w(k) - x(k)$ where e is the control error, W is the required current value, x is the actual current value, $t_K$ is the time, k is the number of sampling intervals and $T_A$ is the sampling time, and in that the manipulated variable is calculated using the following equation:

$$y(k) = K_p*e(k) + Y_I(k-1) + K_I*e(k-1),$$

where y (k) is the manipulated variable, $K_p$ is the proportional gain, $Y_I$ is the integral element of the manipulated variable, $K_I$ is the product of the proportional gain and the quotient of the sampling time and the readjustment time of the regulation, and e (k) is the control error. The method described above allows the manipulated variable to be determined in a relatively short time from the control error. The regulator computation time is thus very short. Computation time in this case refers to the time which passes from reading the actual value via an A/D converter to the time at which the control signal is applied to the converter.

In particular, the readjustment time of the PI regulation is on the one hand set to the time constant of the phase winding of the reluctance machine, and the factor of the integral element is on the other hand set using the following relationship:

$$K_I = \frac{T_A}{2K_S * T_I}$$

where $K_I$ is the factor for the integral element, $T_A$ is the sampling interval, $K_s$ is the path time constant of the controlled system, and $T_t$ is the dead time of the regulation, while the gain factor is readjusted as a function of the rotor position using the following relationship:

$$K_P(\gamma) = \frac{T_1(\gamma)}{2K_S * T_t}$$

where $K_p (\gamma)$ is the gain factor, $T_1 (\gamma)$ is the current-dependent and rotor-position-dependent time constant of the phase winding, $K_s$ is the path time constant and $T_t$ is the dead time of the regulation. Such a setting process results in the control loop having a good time response.

Switched reluctance machines have a time constant which is dependent on the current and the rotor position and for which:

$$T_1(\gamma, i) = \frac{\Psi(\gamma, i)}{i_* * R}$$

where $T_1$ is the time constant, $\Psi$ is the magnetic flux, $\gamma$ is the rotor position, i the phase current and R the pure resistance of the phase winding.

It is particularly advantageous if the time constant $T_1 (\gamma)$ of the phase winding for the q-position and for the d-position of the rotor is determined using the following relationships:

$$T_{1q} = \frac{\Psi(\gamma_q, i_{\max})}{i_{\max} * R}$$

$$T_{1d} = \frac{\Psi(\gamma_d, i_{\max})}{i_{\max} * R}$$

and, for the intermediate positions of the rotor between the q-position and the d-position, are multiplied by the product of the electrical angular position of the rotor and the ratio $T_{1d}/T_{1q}$, where $T_{1q}$ is the time constant of the phase winding in the q-position of the rotor, $T_{1d}$ is the time constant of the phase winding in the d-position of the rotor, $\Psi (\gamma_q, i_{max})$ is the magnetic flux of the reluctance machine when the rotor is in the q-position and the current is a maximum during operation of the reluctance machine, R is the pure resistance of the phase winding and $\Psi (\gamma_d, i_{max})$ is the magnetic flux of the reluctance machine when the rotor is in the d-position and the current is at the maximum value at which the reluctance machine is intended to operate. This method allows the time constant of the phase winding to be determined with sufficient accuracy with a short computation time.

In a further preferred embodiment, whenever a switch-on angle for the phase current is reached, a start pulse is produced by the converter using the following relationship:

$$PWM_{start} = \left(\frac{n}{n_{\max}} + \frac{i_w}{I_{\max}}\right) * PWM_{100\%}$$

where $PWM_{start}$ is the start signal, n is the measured rotation speed, $n_{max}$ is the maximum rotation speed, $I_{max}$ is the maximum current of the drive, $i_w$ is the required current setting and $PWM_{100\%}$ is the pulse-width pulse for full control. Using this start value, the sampling clock rate of the regulation and the process of switching the phases on and off are coordinated such that no angular errors result from the asynchronous relationship between the sampling clock rate and the switching of the winding phases, which is dependent on the rotation speed. Furthermore, the reaction time of the regulation is minimized. In addition, this avoids any discontinuities in the transition from pulsed operation of the reluctance machine to block operation.

In an arrangement for regulating the phase current in a switched reluctance machine, whose stator windings in each phase are each connected to a DC chopper controller, which is connected to a regulator which processes the control error between the required current value and the measured actual current value and applies pulse-width-modulated electrical pulses to the DC chopper controller, the problem is solved, according to the invention, in that the regulator has a microcontroller to whose input side required current values and actual current values can be supplied via an A/D converter, and to which rotation position signals can be supplied which are produced by a rotation position sensor in the reluctance machine. A program calculator the control error and the manipulated variable, using a PI characteristic, is stored in the regulator. The program has a part for separately calculating the proportional and I-elements in accordance with the PI characteristic. The proportional and I elements are added. A constant is stored for calculating the I-element as the quotient of a constant sampling interval and the product of twice the path gain of the controlled system and the dead time of the regulator. In order to determine the gain factor, values of the time constant of the phase winding are stored as a function of the rotor position in a memory.

Furthermore, in order to determine pilot values (which can be formed by multiplication of the rotor rotation speed by characteristic values and are superimposed on the manipulated variable of the output of the regulator), a characteristic map, which contains the derivative of the magnetic flux of the reluctance machine with respect to the electrical angular position as a function of the electrical rotor angle position and the phase current, is stored as a function of the phase current and of the rotor angular position.

A considerable saving in memory space is achieved if the characteristic map includes a series of characteristic values which have been determined in the following way: differentiation of the magnetic flux values of the reluctance machine as a function of the electrical rotor angular position and of the phase currents with respect to the rotor angular position; division of the differentiated values by a saturation current which is typical for the transition to the saturated magnetic state; and formation of the mean values for the respective rotor position.

The invention will be described in more detail in the following text with reference to an exemplary embodiment which is illustrated in the drawings and from which further details, features and advantages are evident.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
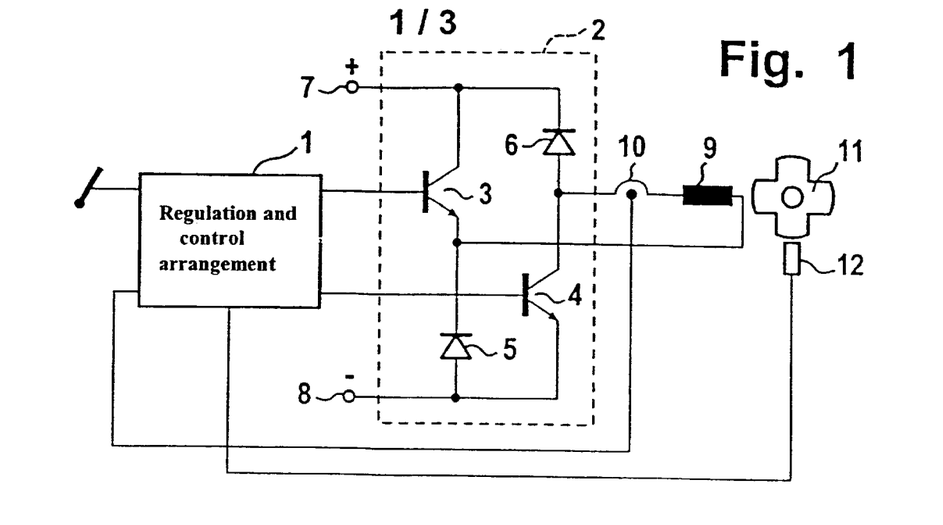
FIG. 1 shows a block diagram of an arrangement for regulating the phase current in a switched reluctance machine.

An arrangement for regulating the phase current in a switched reluctance machine has a regulation and control arrangement which is denoted by 1 in FIG. 1 and to which, at an input, the required current values are supplied which are also stored in the arrangement 1 or are intended to be used as a reference variable. The regulation and control arrangement 1 produces actuating signals for a converter or inverter 2 which has two circuit halves which each comprise a series circuit of a solid-state switch 3, 4 and a freewheeling diode 5, 6, in which the switch 3 and the diode 5 are connected to the positive pole 7 of a DC voltage source, and the switch 3 and the diode 6 are connected to the negative pole 8 of said DC voltage source. A series circuit comprising one phase winding 9 of the reluctance machine and a current sensor is connected to the common junction point between the switch 3 and the diode 5, and the switch 4 and the diode 6. The converter or inverter 2 is a DC chopper controller, whose switches are, in particular, IGBTs.

The reluctance machine may have a number of phases, only one of which is illustrated in FIG. 1. The number of DC chopper controllers corresponds to the number of phase windings.

The rotor 11 of the reluctance machine has a associated rotation position sensor 12 which emits appropriate signals to the regulation and control arrangement 1 as a function of the respective rotation angular position of the rotor 11. The rotation angular position may be coded in absolute values, so that no conversion to a digital variable is required. The rotation position sensor 12 also allows the angular rotation rate to be measured.

Figure 2:
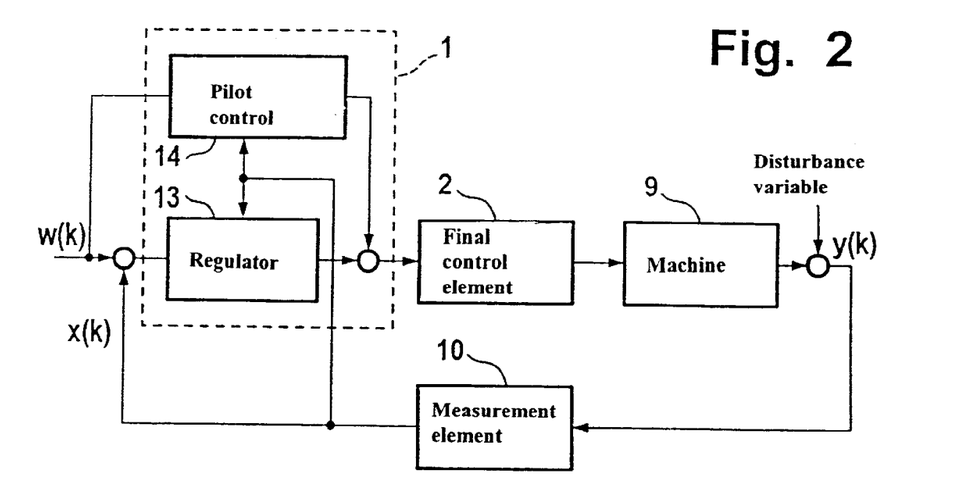
FIG. 2 shows a control loop for regulating the phase current.

FIG. 2 shows a structogramm of the control loop. The converter or inverter 2 is the final control element. The current sensor 10 is the measurement element. The phase winding 9, with its inductance and pure resistance, forms the controlled system. The regulation and control arrangement 1 contains a regulator 13 and a pilot control arrangement 14.

The regulator 13 is intended to be used to apply a voltage via the final control element to the phase winding 9, which voltage is of such a magnitude that the current in the phase winding 9 of the reluctance machine corresponds to the required value, which is denoted by w (k) in FIG. 2. The regulator 13 is in the form of a digital regulator, that is to say it contains a microcontroller, which is not shown in any more detail.

Since the converter or inverter 2 has solid-state switches which operate in the switch mode in order to avoid any power loss, a pulsed voltage for the phase winding 9 is produced from the preset DC voltage $U_d$. Pulse-width-modulated pulses are produced from the DC voltage. A pulse-width-modulation unit (also referred to as PWM) is used for this purpose and, in particular, is integrated in the microcontroller. The constant period duration is set by means of a program, and the pulse width is preset by means of a register.

Figure 3:
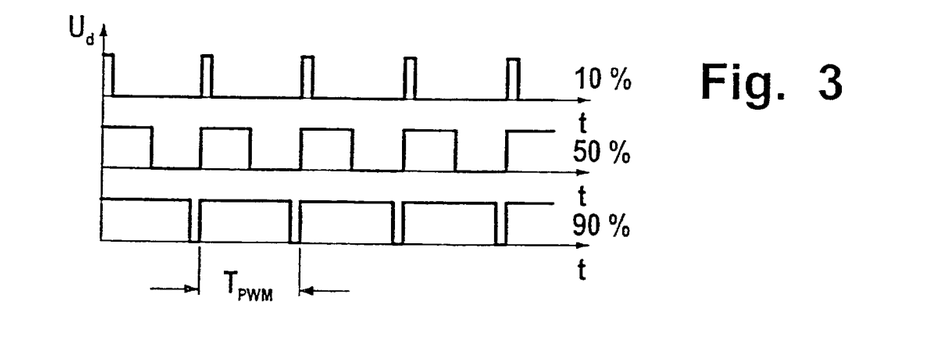
FIG. 3 shows a timing diagram of pulse-width-modulated pulses with different duty ratios.

FIG. 3 shows the pulses for duty ratios of 10%, 50% and 90% for the period $T_{PWM}$. The mean value of the voltage applied to the phase winding 9 may be varied between 0 and 100% or between +100% and −100% of the DC voltage $U_d$, if the forward voltage drop across the semiconductor switches is ignored. The variation in the range +100% and −100% is described in detail in Patent Application 199 43 542.1 from the Applicant, to which reference is hereby made. The control range of the regulator is in this case designed such that the regulation can assume values between +100% and −100%.

If the regulator output is negative, as is the situation if the required value is exceeded, logic causes the PWM to switch backwards and forwards between the two switching states "off" and "short-circuit", in order to reduce the phase current (Mode "0"=decrease current). If the regulator output is positive, if the required current value is undershot, the control logic results in the PWM switching backwards and forwards between "on" and "short-circuit" in order to increase the phase current (Mode "1"=increase current).

The range −100% to 0 is converted to a PWM value of 0 to +100%, and the range between 0 and +100% is likewise converted to a PWM value between 0 and +100%.

This corresponds to a phase voltage of $-U_d$ to 0 in Mode "0" (decrease current), and a phase voltage of =to $+U_d$ in Mode "1" (increase current). In this way, the current regulator controls the mode automatically and there are no discontinuities between the two operating modes "increase current" and "reduce current."

The path gain of the control loop illustrated in FIG. 2 is $K_s = K_{control} * K_{mot} * K_{meas}$, where $K_s$ is the overall path gain, $K_{mot}$ is the gain of the phase winding, and $K_{meas}$ is the gain of the measurement device.

In order to determine the gain of the control element $K_{control}$, the numerical value which must be entered in the register for 100% pulse-width-modulation is set as follows with respect to the DC voltage $U_d$:

$$K_{control} = \frac{U}{100\% \; PWM}$$

The gain of the phase winding 9 is governed by its pure resistance R so that:

$$K_{mot} = \frac{1}{R}$$

This value indicates the current which will be produced for a specific applied (DC) voltage when the reluctance machine rotation speed is zero.

The current sensor 9 supplies the actual values to the digital regulator 13 via an A/D converter (ADC). The gain of the measurement device is then determined as follows:

$$K_{meas} = \frac{ADC_{max}}{I_{max}}$$

that is to say the ratio of the maximum output value of the ADC to the maximum current in the reluctance machine.

By virtue of the microcontroller, the digital regulator 13 operates as a sampling regulator, in which equidistant sampling intervals $T_A$ are preferably used. The sampling interval has a major influence on the dynamic response of the regulation.

The digital regulator 13 operates using a PI (proportional-integral) characteristic and requires the so-called computation time $T_R$ for the time from reading the actual current values via the A/C converter to the time at which the pulse-width-modulation unit is operating with the respectively newly determined pulse-width value.

The steady-state mean value of the sampling time is added to this computation time $T_R$. This results in the dead time $T_t$ for the regulator 13:

$$T_1 = T_R + T_A/2$$

A disturbance variable may occur in the time period from immediately after to immediately before the sampling by the A/D converter. However, the shortest effective computation time is the period of the pulse-width-modulation, since no new PWM value is transferred until the PWM unit starts a new period.

Figure 4:
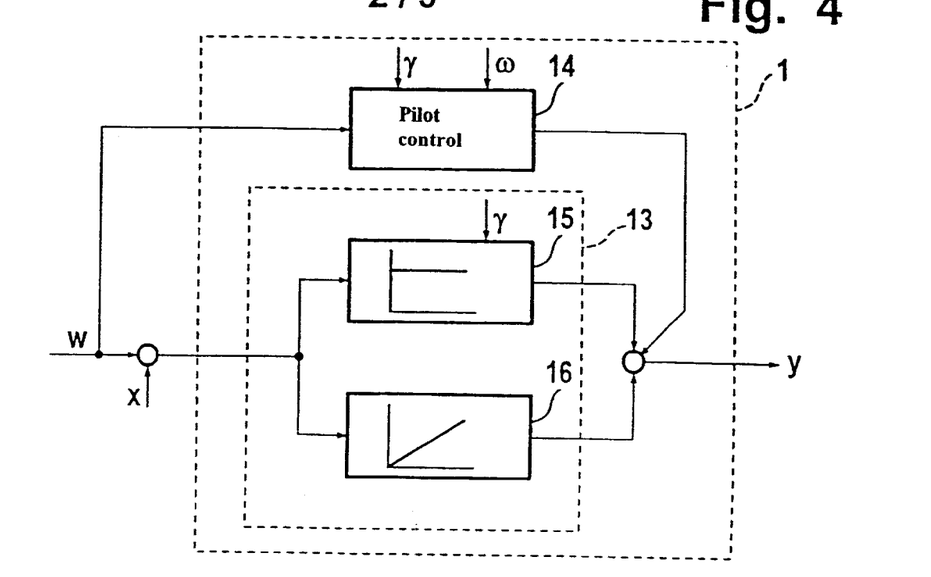
FIG. 4 shows further details of the structogramm illustrated in FIG. 2.

FIG. 4 shows the structure of the PI regulator 13 within the control and regulation arrangement 1. A P element 15 with a gain of P, and an I-element 16 with a readjustment time of $T_n/K_p$ are provided.

The I-element is determined by the constant $$K_1 = \frac{K_p * T_A}{T_n}$$

where $T_A$ is the sampling time.

The control error e (k) is calculated by the regulation and control arrangement 1 at each time $t_K = k*T_A$, based on the required value w (k) and the actual value of the current x (k), as follows, $$e(k) = w(k) - x(k)$$

The P-element $y_p$ (k) is determined from the control error e (k) as follows:

$$y_p(k) = K_p * e(k-1)$$

The I-element $$y_I(k) = K_1 \sum_{i=0}^{k-1} e(i)$$

is determined separately from the P-element. The P and I elements are added, thus giving: $y(k) = y_p(k) + y_I(k)$ In order to reduce the computation complexity, only the changes $\Delta y$ (K) from the previous value y (k−1) are calculated and added to this:

$$y(k) = y(k-1) + \Delta y(k)$$

The P and I-elements are then given by:

$$\Delta y_p(k) = K^p[e(k) - e(k-1)]$$

and $$\Delta y_1(k) = K_1 e(k-1)$$

The combined elements $y_p$ (k) and $y_I$ (k) are:

$$y_p(k) = K_p * e(k)$$

and $$y_I(k) = y_I(k-1) + K_I * e(k-1)$$

Since only the error and the I-element which was determined in the previous sampling interval need ever be stored when using the procedure described above, this results in a short computation time.

In a switched reluctance machine, the electrical time constant of the individual phase windings is highly dependent on the rotor rotation position γ and on the phase current i. This results in a current-dependent and position-dependent time constant $T_1$ (γ, i) which is determined from the flux characteristic as a function of the current, that is to say:

$$T_1(\gamma, i) = \frac{\Psi(\gamma, i)}{i * R}$$

The time constant $T_1$ (γ, i) can be stored as a characteristic map and can read in each regulation cycle.

Figure 5:
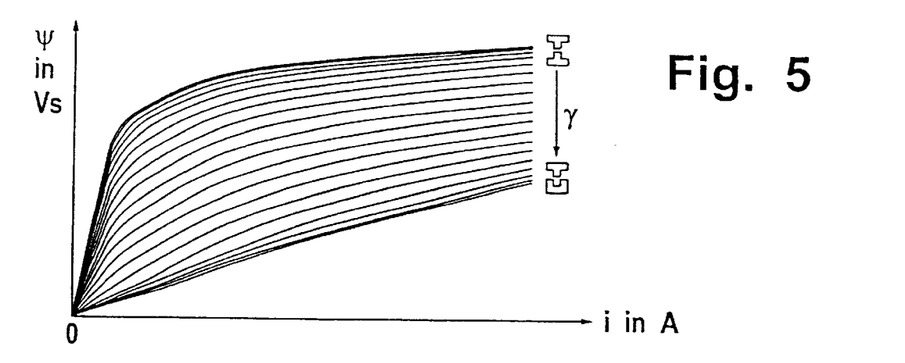
FIG. 5 shows characteristics, which are typical for a reluctance machine, for the flux as a function of the phase current, with the rotor rotation position as a parameter.
Figure 7:
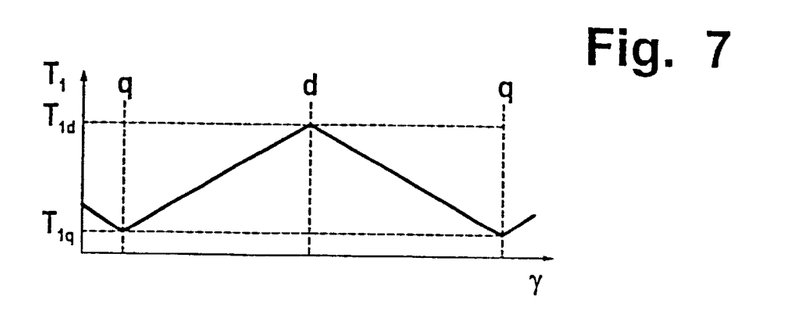
FIG. 7 shows the approximate profile of the time constant of the reluctance machine as a function of the rotor rotation position.

FIG. 5 shows a typical characteristic of the flux Ψ of a reluctance machine as a function of the phase current i, with the rotation position γ of the rotor as a parameter. The rate of change of the current is determined from the gradient of a straight line through the origin and the instantaneous operating point on the Ψ-i characteristic. It has been found that an approximate determination of the time constant leads to good regulation characteristics, described below:

In a switched reluctance machine, the magnetic reluctance varies as a function of the rotation position of the rotor. The minimum value is reached when a rotor tooth is opposite a stator tooth which has been excited by current. This position is referred to as a direct-axis field position or d-position. When the center of the rotor slot is opposite a stator tooth which has been excited by current, the magnetic reluctance is at its maximum. This position is referred to as the quadrature-axis field position, or q-position. The phase inductance L varies inversely with the magnetic reluctance. An idealized profile with respect to the rotor rotation position γ can be assumed for the phase inductance and thus for the time constant. This profile is shown for the time constant $T_1$ in FIG. 7. The time constant $T_1$ for the q-position, and the maximum current at which the switched reluctance machine should be operated are given by:

$$T_{1q} = \frac{\Psi(\gamma_q, i_{max})}{i_{max} * R}$$

The time constant in the d-position is given by:

$$T_{1d} = \frac{\Psi(\gamma_d, i_{max})}{i_{max} * R}$$

The intermediate values of the time constants between $T_{1q}$ and $T_{1d}$ are defined by a straight line which runs through the two points $T_{1q}$ and $T_{1d}$. FIG. 7 shows the profile of the time constants for motor and generator operation of the reluctance machine.

This gives good results since the only occasion on which a sudden change in the required value is applied to the regulator 13 is when a phase is switched on. This occurs in the vicinity of the q-position for motor operation, and in the vicinity of the d-position when in generator operation. For all other rotor positions, the current in general just has to be regulated at a constant actual value. However, the current may also be preset as a reference variable.

The readjustment time $T_n$ of the regulator 13 is set to be equal to the time constant of the controlled system. This results in a readjustment time which is dependent on the rotor rotation position:

$$T_n(\gamma) = T_1(\gamma)$$

The regulation is set on the basis of the optimum magnitude. On this basis, the gain factor of the regulator 13 is calculated to be $$K_P(\gamma) = \frac{T_1(\gamma)}{2K_s * T_t}$$

since $T_t$ is the sum of the shortest time constants and there are no further time constants in the control loop.

For the I-element of the regulator 13:

$$K_I = \frac{T_A}{2K_s * T_1}$$

$K_I$ is thus independent of the rotor position. The phase current regulator thus has a constant I-element and a P-element which is readjusted adaptively (as a function of the rotor position). FIG. 4 shows this regulation structure.

The phase voltage induced in the phase winding 9 depends on the rotor rotation position γ, the phase current i and the angular velocity ω. The rotating element of the induce phase voltage $u_{rot}(\gamma, i)$ is:

$$u_{rot}(\gamma, i) = \frac{\partial \Psi(\gamma, i)}{\partial \gamma} * \omega$$

Figure 8:
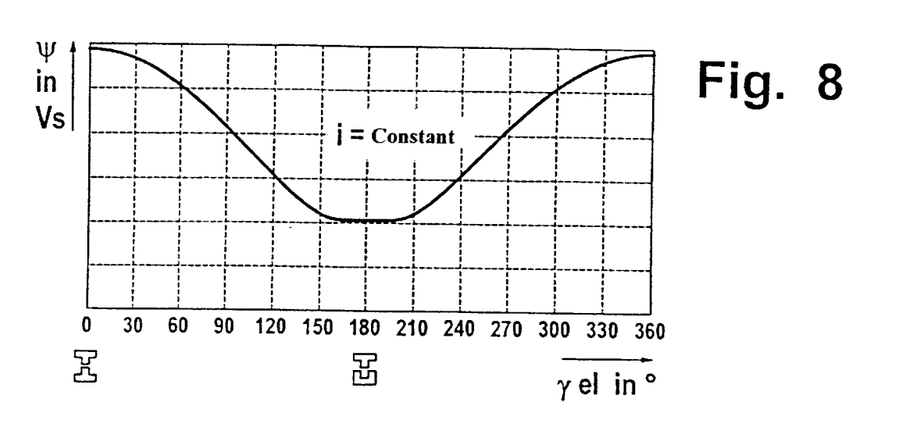
FIG. 8 shows a characteristic, which is typical for the reluctance machine, of the magnetic flux as a function of the rotor rotation position with a constant phase current.

In the vicinity of the q-position, the induced voltage is 0, then initially increases slowly and, beyond a specific electrical rotor angle, rises very steeply in order then to remain at one point. This behaviour can be explained with reference to FIG. 8. In order to prevent the phase current from assuming undesirable values during the final sampling time as a result of the induced voltages having steep profiles, the manipulated variable at the output of the regulator 13 has a pilot control variable superimposed on it, which corresponds to the present value of the induced voltage in the phase 9, and is thus made dependent on γ, i and ω.

The pilot control value can be read from the characteristic $$\frac{d\Psi}{d\gamma}(\gamma, i)$$

which is determined and stored for the respective reluctance machine, as a function of the present phase current, can be multiplied by the rotation speed or the angular velocity, and can be added to the output of the regulator 13.

However, it has been found that there is no need to determine the induced voltage exactly, since the regulator 13 compensates for relatively small errors between the required value and the actual value well. The pilot control values can thus be determined in a simpler manner.

Figure 6:
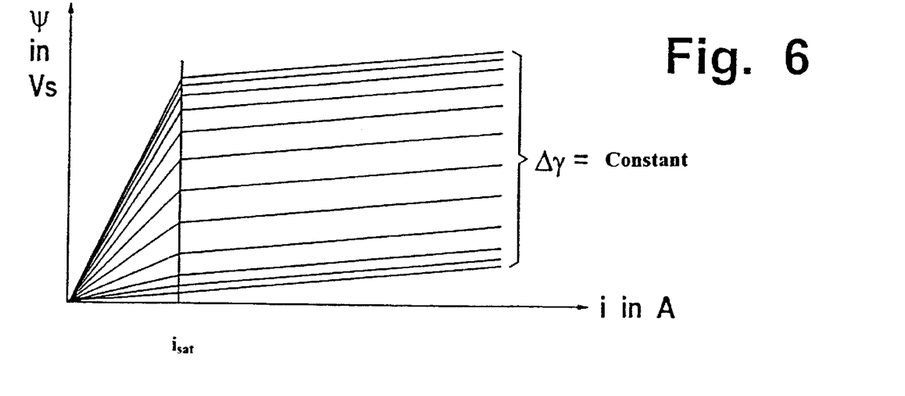
FIG. 6 shows approximated characteristics of the flux as a function of the phase current for a reluctance machine.

It is assumed that, in the unsaturated region of the Ψ-i characteristics, as shown in FIG. 5, the partial derivative $$\frac{\partial \psi}{\partial \gamma_{i=const}}$$

is related linearly to the phase current for any given rotor angle. This linear profile is shown in FIG. 6. In the saturation region, the Ψ-i characteristics are assumed to be straight lines which run parallel, and are likewise illustrated in FIG. 6. The characteristic map δΨ (γ, i) can thus be reduced to the profile $$\left[\frac{\partial \psi}{I * \partial \gamma}\right]_{mean} = f(\gamma)$$

In the linear region, the induced voltage is then given by:

$$u_{rot}(\gamma, i) = \left[\frac{\partial \psi}{I * \partial \gamma}\right]_{mean} * i * \omega$$

In the saturated region, for currents above $I_{sat}$:

$$u_{rot}(\gamma, i) = \left[\frac{\partial \psi}{I * \partial \gamma}\right]_{mean} * i_{sat} * \omega$$

In order to determine the profile of $$\left[\frac{\partial \psi}{I * \partial \gamma}\right]_{mean}$$

the Ψ (γ, i) profiles are formed for all the phase current values contained in the $$\frac{\partial \Psi}{\partial \gamma}(\gamma)$$

data set,
are divided by the phase current limited to $I_{sat}$, and are averaged. The resultant profile is used to calculate the induced voltage.

Figure 9:
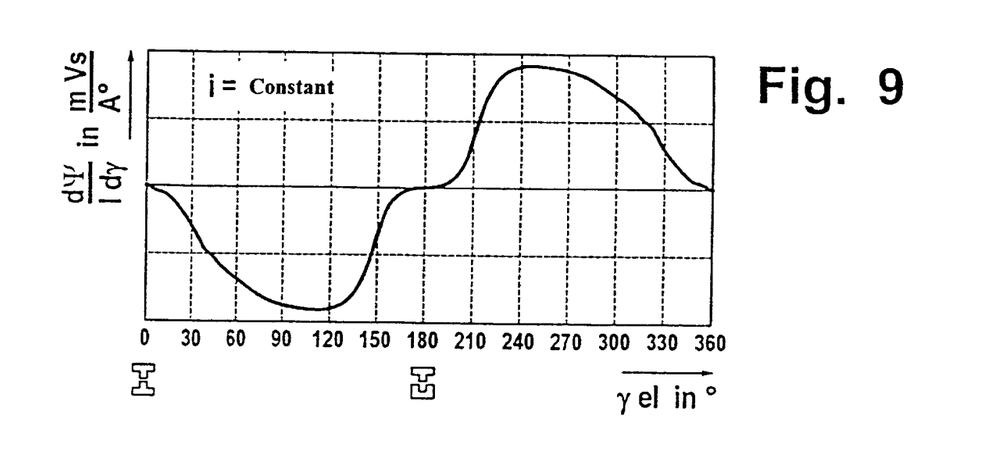
FIG. 9 shows the partial derivative of the characteristic shown in FIG. 8 with respect to the rotor rotation position for a constant phase current.

FIG. 9 illustrates a profile which is typical for a reluctance machine $$\left[\frac{\partial \psi}{I * \partial \gamma}\right]_{mean}$$

Such a characteristic for the respective reluctance machine is stored in a one-dimensional table, as is illustrated in FIG. 4 by the block annotated pilot control. An appropriate value is read from the table as a function of the phase current and of the rotor rotation position, is multiplied by the rotation speed or the angular velocity, and is added, as a pilot control value, to the regulator output. The value for the saturation limit $I_{sat}$ is set for the d-position in the region of the sharpest curvature of the Ψ-i characteristic.

All the phase-current regulators and pulse-width-modulation units expediently operate synchronously with a common timebase.

The individual phases must be switched on and off as a function of the present rotor position and of the on-and-off-switching angles. Owing to the variable rotation speed of the GRM, this switching of the phases is completely asynchronous with respect to the clock.

In order to avoid the regulator cycle just having been processed on reaching the switch-on angle, and thus not being calculated until after the next sampling time $T_A$ in the new PWM value, a start value is provided which is deliberately matched to the present operating point of the input drive, and is entered in the PWM register as soon as the switch-off angle is reached. The PWM output of the microcontroller is then switched to be inactive, so that the pulse-width setting does not yet have any effect. This is ensured by a programmable logic device (PLD). In practice, this then links the two asynchronous processes to one another (sampling clock of the regulator and the on- and off-switches for the phases).

A further advantage of this start value for the PWM is that the reaction time of the regulator in response to a phase being switched on is minimized.

A further reason in favour of the use of a PWM start value is the transition from pulsed operation of the GRM to block operation. In pulsed operation, the regulator has to act as a limiting element for the phase current. In block operation, however, the regulator output must be driven at the 100% level beyond the switch-on angle in order to make the full intermediate-circuit voltage available for that phase. This is the only way in which the GRM can be used optimally. This transition does not take place suddenly, but is dependent on the rotation speed and the required current value.

It therefore makes sense not to use a constant start value for the PWM, but to produce a relationship between the rotation speed and the required current value. One possible way of achieving this is:

$$PWM_{start} = \left(\frac{n}{n_{max}} + \frac{i_w}{I_{max}}\right) * PWM_{100\%}$$

In this case, $n_{max}$ is the maximum rotation speed and $I_{max}$ is the maximum current of the input drive. $i_w$ is the required current setting, and $PWM_{100\%}$ is the PWM value for full drive.

The DC chopper controller illustrated in FIG. 1 operates in the two-quadrant mode.

Three of these DC chopper controllers are required to operate a three-phase GRM and, in a corresponding manner, three identical current regulators, which are independent of one another.

This topology results in the current flowing in one direction in that phase, although this does not limit the operating range of the GRM, since the torque is formed independently of the current direction. Four switching states can be provided with this embodiment of the converter.

If both switches 3 and 4 are switched on (switching state: on), the positive supply voltage $+U_d$ is applied to that phase, as a result of which the phase current rises. The power is drawn from the voltage source. If one switch 3 or 4 is open and the other respective switch is closed (switching state: short-circuit), then the phase current flows via the corresponding diode 6 or 5, respectively. The phase is thus short-circuited, and the phase voltage is 0V, ignoring the forward voltage dropped across the switches. No energy is exchanged with the source. If both switches are open (switching state: off), the phase current flows via both diodes, which means a phase voltage of $-U_d$. The power is fed back into the source.

The regulation method according to the invention can in principle also be used with other converter topologies.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for regulating the phase current in a switched reluctance machine, whose stator windings in each phase are each connected to a DC chopper controller, which is connected to a regulator which processes control error between the required current value and a measured actual current value and applies pulse-width-modulated electrical pulses to the DC chopper controller, comprising the steps of:

determining the control error from the required current values and from actual current values obtained by sampling at equidistant intervals:

digitally forming a first manipulated variable from the control error using a proportional-integral characteristic, by linear superimposition of an integral element and a proportional element and by multiplying said proportional-integral characteristic by a respective electrical angular position of the reluctance machine rotor;

linearly superimposing a second manipulating variable on the first manipulated variable wherein said second manipulated variable is formed as a pilot control value of a characteristic value by multiplication by the rotor rotation speed, which characteristic value is read, as a function of the phase current and as a function of the electrical angular position, from a characteristic map, which includes the derivative of the magnetic flux of the reluctance machine with regard to the electrical angular position, as a function of the electrical angular position of the rotor and as a function of the phase current.

2. The method according to claim 1, including the step of storing characteristic values in a table as a function of the electrical rotor angle positions, wherein the characteristic values are determined from a data set with the magnetic flux values of the reluctance machine as a function of the electrical rotor angular position and of the phase currents by deriving the flux values with respect to the rotor angle, by division by a saturation current which is typical for the transition to the saturated magnetic state, and by forming the mean values of the respective rotor position, and in that the pilot value is formed by multiplication of the characteristic value, which is read as a function of the measured electrical rotor angular position, by the rotation speed and the phase current.

3. The method according to claim 1, including the step of calculating the control error at the time $t_K = k*T_A$ using the following equation:

$$e(k) = w(k) - x(k)$$

where e (k) is the control error, W (k) is the required current value, x (k) is the actual current value, $t_K$ is the time, k is the number of sampling intervals and $T_A$ is the sampling time, and in that the manipulated variable is calculated using the following equation:

$$y(k) = K_p * e(k) + Y_I(k-1) + K_I * e(k-1)$$

where y (k) is the manipulated variable, $K_p$ is the proportional gain, $Y_I$ is the integral element of the manipulated variable, $K_I$ is the product of the proportional gain and the quotient of the sampling time and the readjustment time of the regulation, and e is the control error.

4. The method according to claim 1, including the step of setting a readjustment time of the PI regulation to the time constant of the phase winding of the reluctance machine, and setting a factor of the integral element using the following relationship:

$$K_1 = \frac{T_A}{2K_S * T_1}$$

where $K_I$ is the factor for the integral element, $T_A$ is the sampling interval, $K_s$ is the path time constant of the controlled system, and $T_t$ is the dead time of the regulation, while the gain factor is readjusted as a function of the rotor position using the following relationship:

$$K_p(\gamma) = \frac{T_1(\gamma)}{2K_S * T_t}$$

where $K_p(\gamma)$ is the gain factor, $T_1(\gamma)$ is the current-dependent and rotor-position-dependent time constant of the phase winding, $K_s$ is the path time constant and $T_t$ is the dead time of the regulation.

5. The method according to claim 1, including the step of determining a time constant of the switched reluctance machine using the following equation:

$$T_1(\gamma, i) = \frac{\Psi(\gamma, i)}{i_* * R}$$

where $T_1$ is the time constant, $\Psi$ is the magnetic flux, $\gamma$ is the rotor position, i the phase current and R the pure resistance of the phase winding.

6. The method according to claim 1, including the step of determining a time constant $T_1(\gamma)$ of the phase winding for the q-position and for the d-position of the rotor using the following relationships:

$$T_{1q} = \frac{\Psi(\gamma_q, i_{max})}{i_{max} * R}$$

$$T_{1d} = \frac{\Psi(\gamma_d, i_{max})}{i_{max} * R}$$

and, for the intermediate positions of the rotor between the q-position and the d-position, are multiplied by the product of the electrical angular position and the ratio $T_{1d}/T_{1q}$, where $T_{1q}$ is the time constant of the phase winding in the q-position of the rotor, $T_{1d}$ is the time constant of the phase winding in the d-position of the rotor, $\Psi(\gamma_q, i_{max})$ is the magnetic flux of the reluctance machine when the rotor is in the q-position and the current is a maximum during operation of the reluctance machine, R is the pure resistance of the phase winding and $\Psi(\gamma_d, i_{max})$ is the magnetic flux of the reluctance machine when the rotor is in the d-position and the current is at the maximum value at which the reluctance machine is intended to operate.

7. The method according to claim 1, including the step of producing a start pulse, whenever a switch-on angle for the phase current is reached, using the following relationship:

$$PWM_{start} = \left(\frac{n}{n_{max}} + \frac{i_w}{I_{max}}\right) * PWM_{100\%}$$

where $PWM_{start}$ is the start pulse, n is the measured rotation speed, $n_{max}$ is the maximum rotation speed, $I_{max}$ is the maximum current of the drive, $i_w$ is the required current setting and $PWM_{100\%}$ is the pulse-width pulse for full control.

8. An apparatus for regulating the phase current in a switched reluctance machine, whose stator windings in each phase are each connected to a DC chopper controller, which is connected to a regulator which processes the control error between the required current value and the measured actual current value and applies pulse-width-modulated electrical pulses to the DC chopper controller, said apparatus comprising:

a regulator having a microcontroller to whose input side required current values (e (k)) and actual current values (x (k)) are supplied via an A/D converter, and to which rotation position signals are supplied which are produced by a rotation position sensor in the reluctance machine:

means for calculating the manipulated variable (y (k)) from the control error using a PI characteristic is stored in the regulator, wherein separately calculated proportional and I-elements are added, and a stored constant is used to calculate the I-element as the quotient of a constant sampling interval and the product of twice a path gain of the controlled system and a dead time of the regulator:

means for storing values of a time constant of the phase winding, as a function of the rotor position, in a memory in order to determine a gain factor:

means for determining pilot values by multiplication of the rotor rotation speed by characteristic values stored in a characteristic map, and superimposed on the manipulated variable of an output of the regulator wherein said characteristic map contains the derivative of the magnetic flux of the reluctance machine with respect to the electrical angular position as a function of the electrical rotor angle position and the phase current.

9. The apparatus according to claim 8, wherein the characteristic map comprises a series of characteristic values which are each determined from the derivative of the magnetic flux values of the reluctance machine as a function of the electrical rotor angular position and of the phase currents with respect to the rotor angular position and by division of these derivative values by a saturation current, which is typical for the transition to the saturated magnetic state, and by forming the mean values for the respective rotor position.

10. The apparatus according to claim 8, further comprising a programmable logic module for writing a start value to a pulse-width-modulation register.

* * * * *